No. 721,512. PATENTED FEB. 24, 1903.
C. B. GARRISON.
HAT PIN AND FASTENER.
APPLICATION FILED JUNE 16, 1902.
NO MODEL.
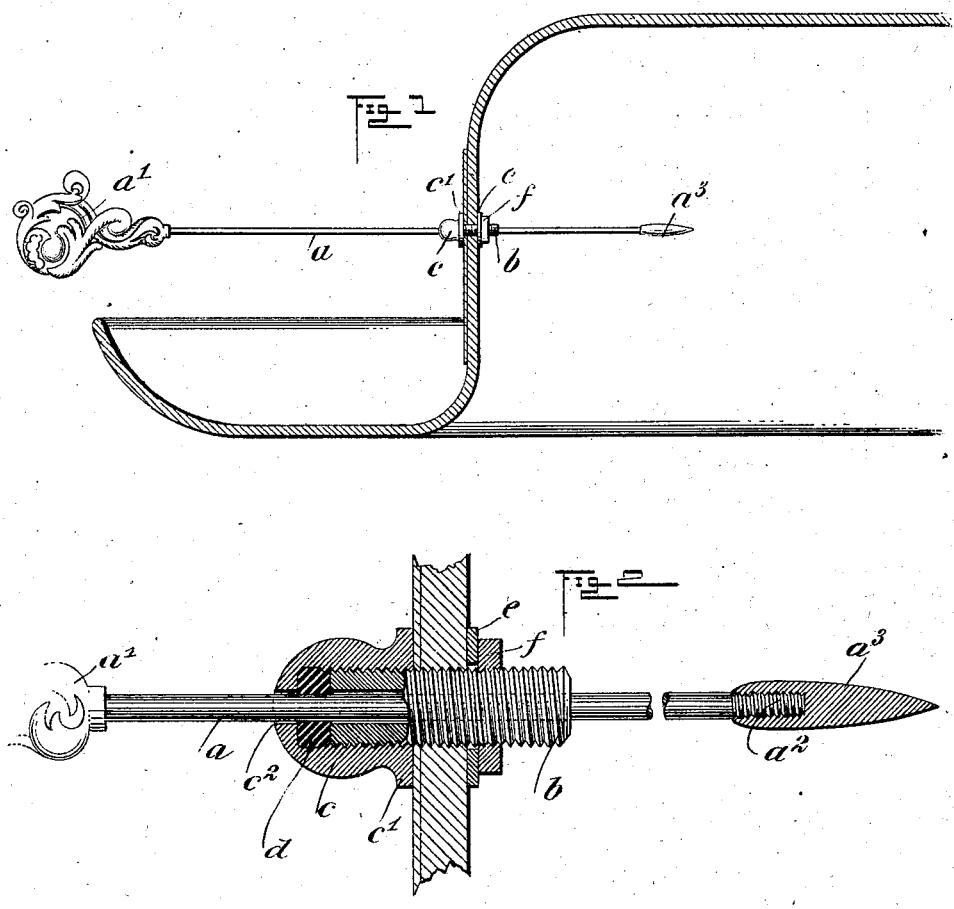
WITNESSES:
INVENTOR
Clarence B. Garrison
BY
ATTORNEYS.

UNITED STATES PATENT OFFICE.

CLARENCE BROOKS GARRISON, OF CINCINNATI, OHIO.

HAT-PIN AND FASTENER.

SPECIFICATION forming part of Letters Patent No. 721,512, dated February 24, 1903.

Application filed June 16, 1902. Serial No. 111,891. (No model.)

*To all whom it may concern:*

Be it known that I, CLARENCE BROOKS GARRISON, a citizen of the United States, and a resident of Cincinnati, in the county of Hamilton and State of Ohio, have invented a new and Improved Hat-Pin and Fastener, of which the following is a full, clear, and exact description.

This invention relates to a means for mounting hat-pins in a hat so that the pins may be moved freely into and out of operative position without actually detaching them from the hat, while at the same time the devices employed permit the complete removal of the pin when desired. By these means the formation of numerous holes in the hat is avoided and the pin is securely held.

The invention also provides for improvements in the pin itself, which improvements adapt the pin to the fastening or holding device.

This specification is an exact description of one example of my invention, while the claims define the actual scope thereof.

Reference is to be had to the accompanying drawings, forming a part of this specification, in which similar characters of reference indicate corresponding parts in both views.

Figure 1 is a sectional view showing the invention applied to a hat, and Fig. 2 is an enlarged section illustrating the detailed construction.

The pin itself comprises a main portion or shank $a$, at one end of which is the usual head $a'$ and at the other end of which are formed threads $a^2$, on which is screwed an enlarged point $a^3$, which not only serves to effect a more secure engagement between the pin and hair of the wearer, but after having been once put in place prevents the dislodgement of the pin from the fastening or holding device. The rear end of the enlarged point $a^3$ is tapered till it merges with the shank of the pin. This construction while preventing it from working out of place in the hair permits it to be removed therefrom when desirable without separating the said point from the end of the shank.

The holding device comprises an exteriorly-threaded sleeve $b$, which is passed through the hat, as shown, and on the outer end of which is screwed a knob $c$, having a clamping-flange $c'$ lying against the outer side of the hat and having an opening $c^2$ in line with the opening through the sleeve $b$. Situated in the knob and bearing against the outer end of the sleeve $b$ is a mass $d$ of rubber or other equivalent material. Through this rubber the hat-pin is passed, and owing to the frictional engagement between the rubber and the pin the pin is held tightly in the fastening and when once adjusted will be retained in that adjustment until withdrawn by positive pressure. At the inner side of the hat a clamping disk or washer $e$ is located, and against this bears a nut $f$, which is screwed on the sleeve $b$. Said nut and washer answer the purpose of a stop or collar on the sleeve $b$. By tightening up the nut $f$ the parts may be held firmly on the hat, and then to insert the pin the enlarged point $a^3$ should first be removed and the pin thrust through the cap $c$, rubber $d$, and sleeve $b$, after which said enlarged point $a^3$ should be again applied to the end of the pin. The device is now ready for use and should be employed in the usual manner.

When a pin has been used for some time and has come to work loosely within the yielding material $d$, the nut $f$ may be loosened somewhat and the cap $c$ screwed up farther on the sleeve $b$ to compress the yielding material $d$ between the cap and the end of the sleeve, thereby causing the said yielding material to come into binding engagement with shank of the pin $a$.

Various changes in the form and details of my invention may be resorted to at will without departing from the spirit of my invention. Hence I consider myself entitled to all forms of the invention that may lie within the intent of my claims.

Having thus described my invention, I claim as new and desire to secure by Letters Patent—

1. A hat-pin fastener, comprising a sleeve, an adjustable cap fastened to one end thereof, a mass of yielding material held within the cap against the end of the sleeve, said parts having a longitudinal aperture adapted to snugly receive the pin, said aperture extending through the sleeve, the yielding material and the top of the cap, and a clamping device carried on the other end of the sleeve.

2. A hat-pin fastener, comprising an exteriorly-threaded sleeve, a cap screwed on one end thereof, a mass of yielding material in the cap and held thereby against said end of the sleeve, and adapted to be compressed between said parts and a clamping-nut on the other end of the sleeve.

3. A hat-pin fastener, comprising a sleeve, a cap adjustably fastened to one end thereof, a mass of yielding material held within the cap and adapted to be compressed between said cap and the end of the sleeve, and a clamping device carried on the other end of the sleeve, a hat-pin projected through the sleeve and through said mass of yielding material, and an enlarged point removably carried at the inner end of the pin.

4. A hat-pin fastener, comprising an exteriorly-threaded sleeve, having a longitudinal aperture adapted to receive the hat-pin; a stop or collar on one end of the sleeve, and an adjustable cap secured on the other end thereof, said cap having an aperture in its outer end of substantially equal diameter with the aperture of the collar, and registering and alining with said aperture, and a mass of yielding material held within said cap against the end of said sleeve and in engagement with the pin, whereby an adjustment of the cap will increase or diminish the compression upon the yielding material and thereby regulate the hold of said material upon the pin.

5. A hat-pin fastener, comprising a sleeve; a stop or collar on one end of the sleeve for engaging the side of the hat; a mass of yielding material held against the other end of the sleeve in engagement with the pin, and means for compressing the same to give an adjustable frictional grasp upon the pin, as set forth.

In testimony whereof I have signed my name to this specification in the presence of two subscribing witnesses.

CLARENCE BROOKS GARRISON.

Witnesses:
EDWARD LEE BOHNETT,
WILLIAM D. PIEPHO.